J. PATTEN & E. B. MILLER.
RECORDING APPARATUS FOR SAFE DEPOSIT BOXES.
APPLICATION FILED AUG. 22, 1914.
1,274,761.
Patented Aug. 6, 1918.
7 SHEETS—SHEET 4.
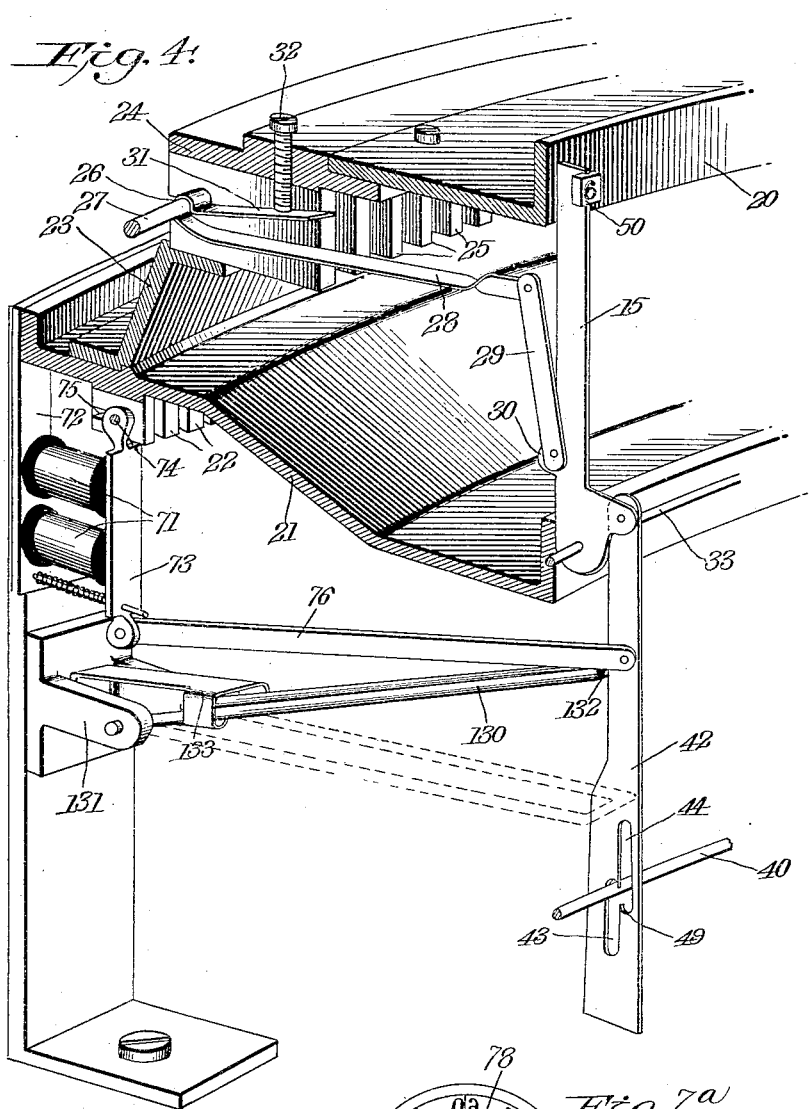
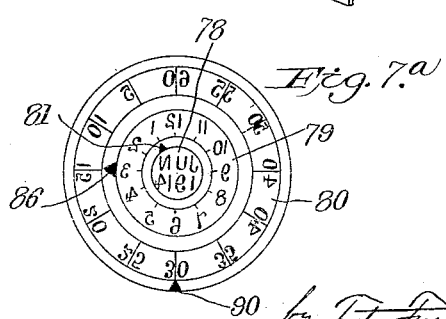
Witnesses
G. T. Baker.
B. M. Kent.
Inventors
John Patten and
Ernest B. Miller
by Foster Freeman Watson Hoit
Attorneys J. PATTEN & E. B. MILLER.
RECORDING APPARATUS FOR SAFE DEPOSIT BOXES.
APPLICATION FILED AUG. 22, 1914.
1,274,761.
Patented Aug. 6, 1918.
7 SHEETS—SHEET 5.
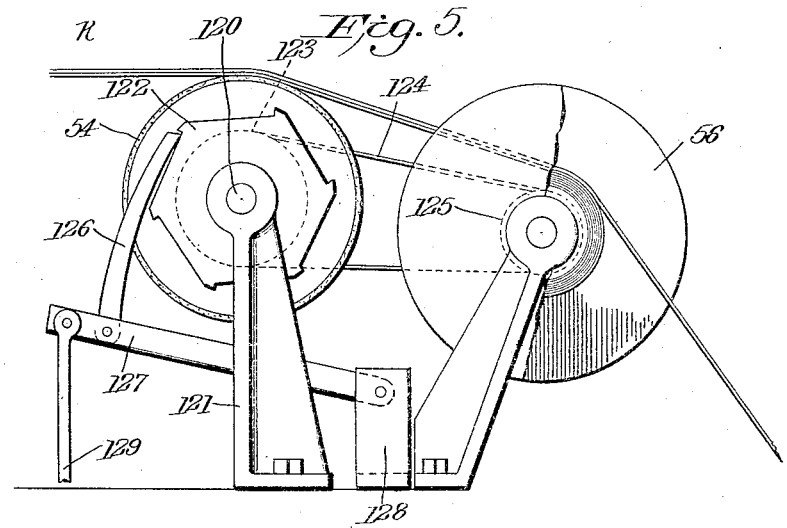
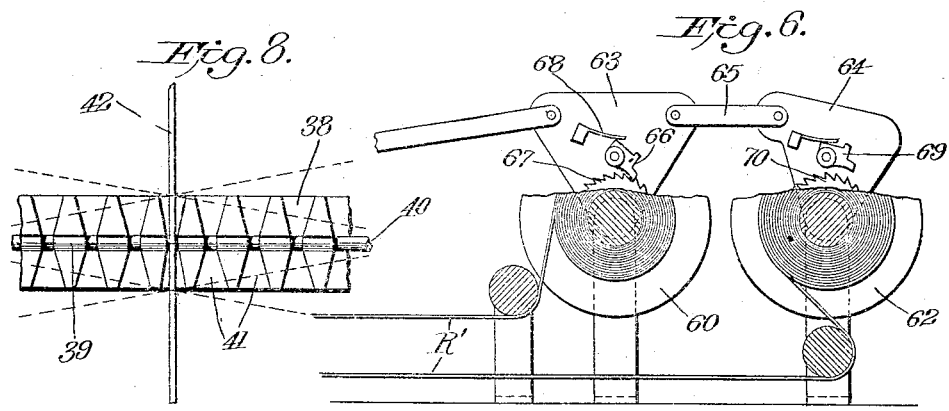
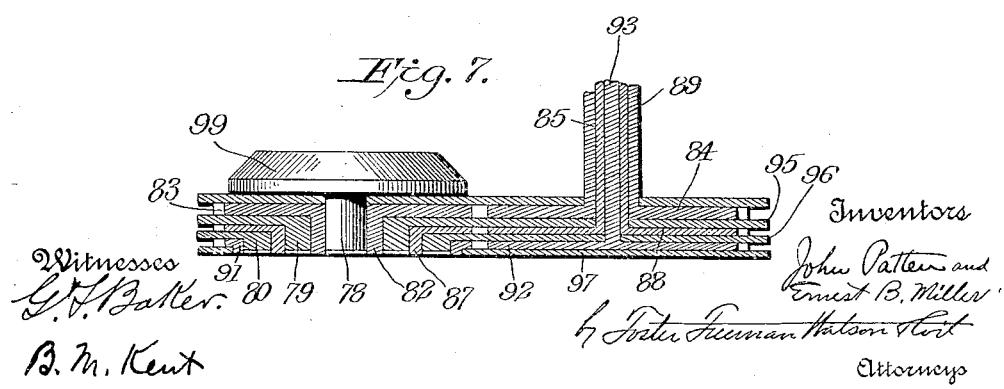

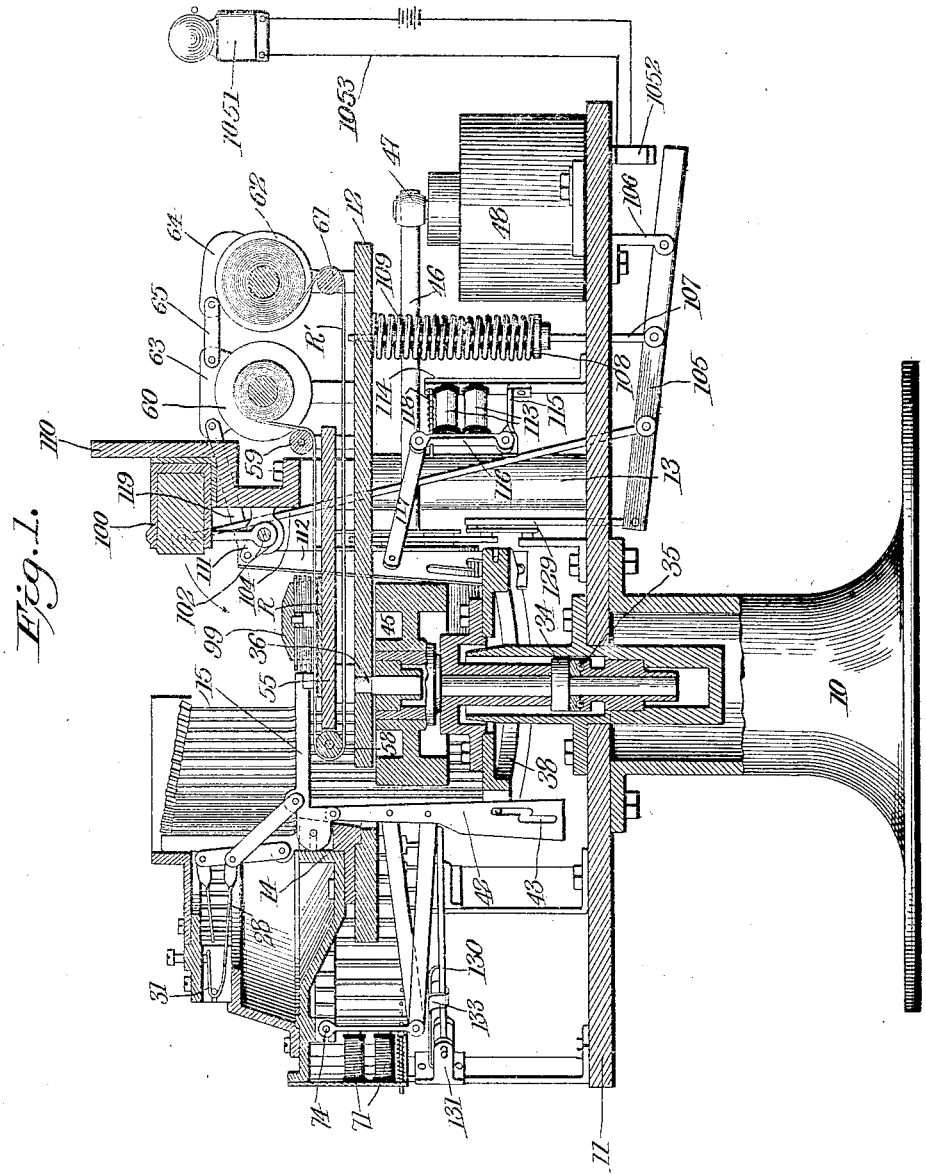

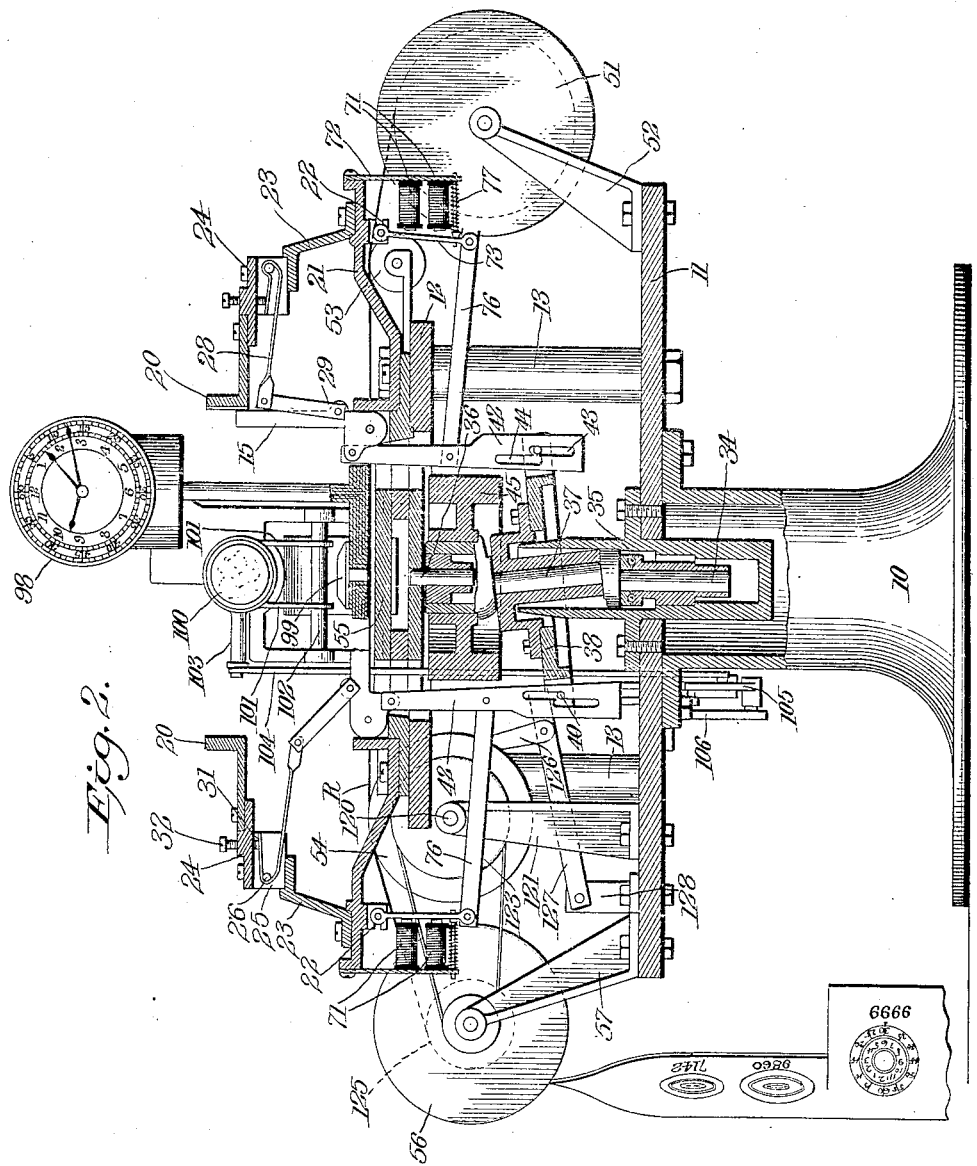

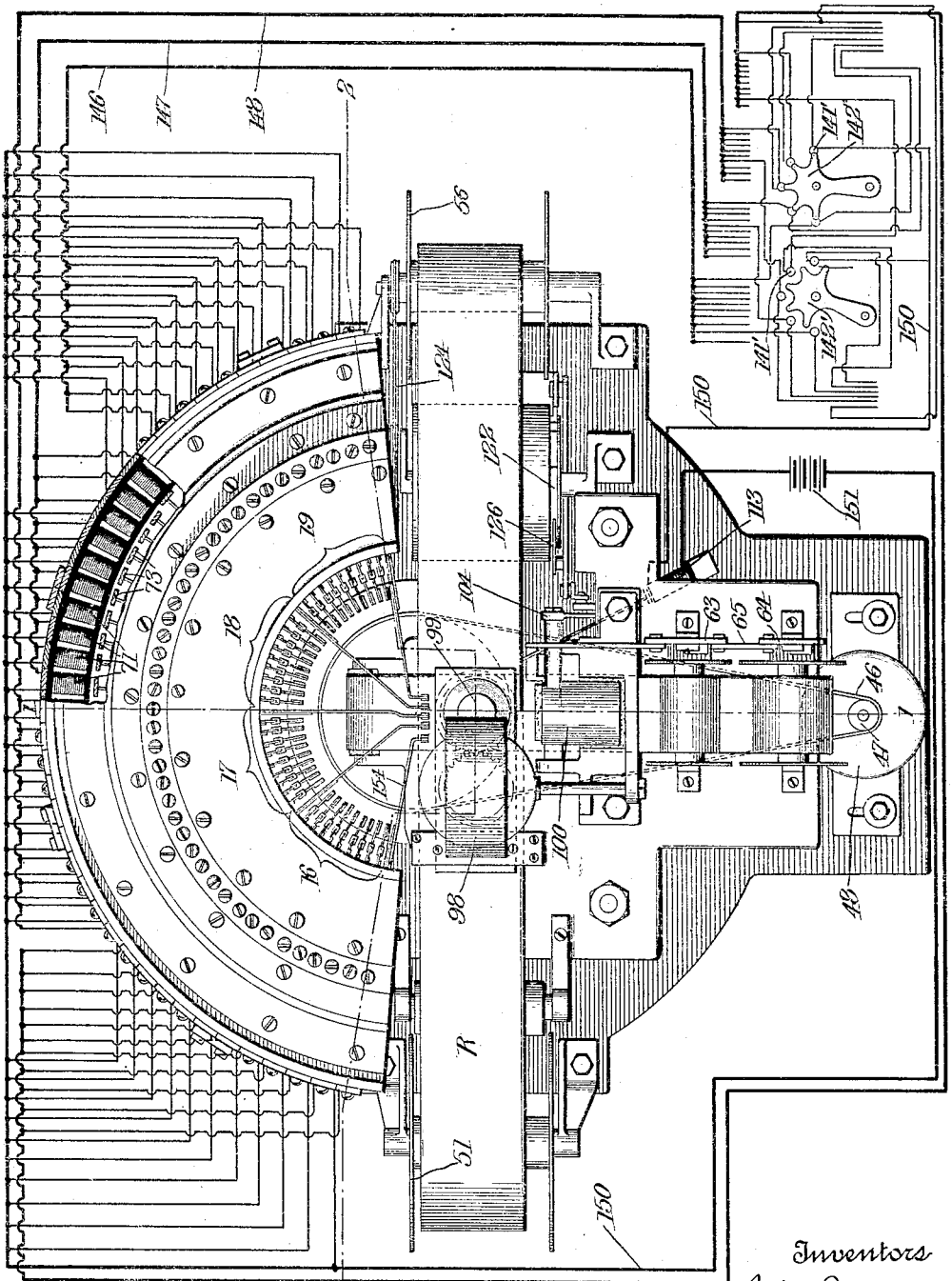

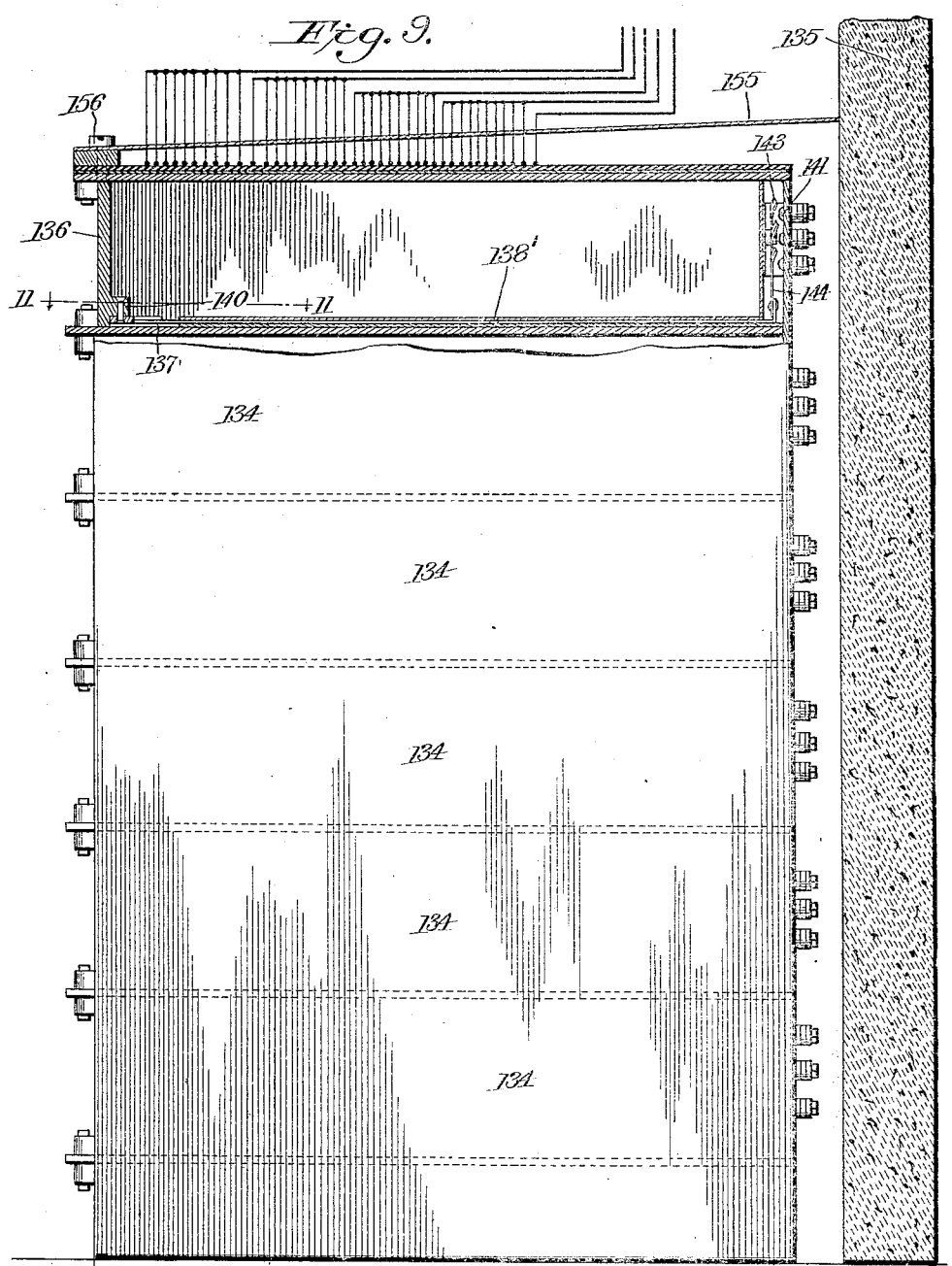

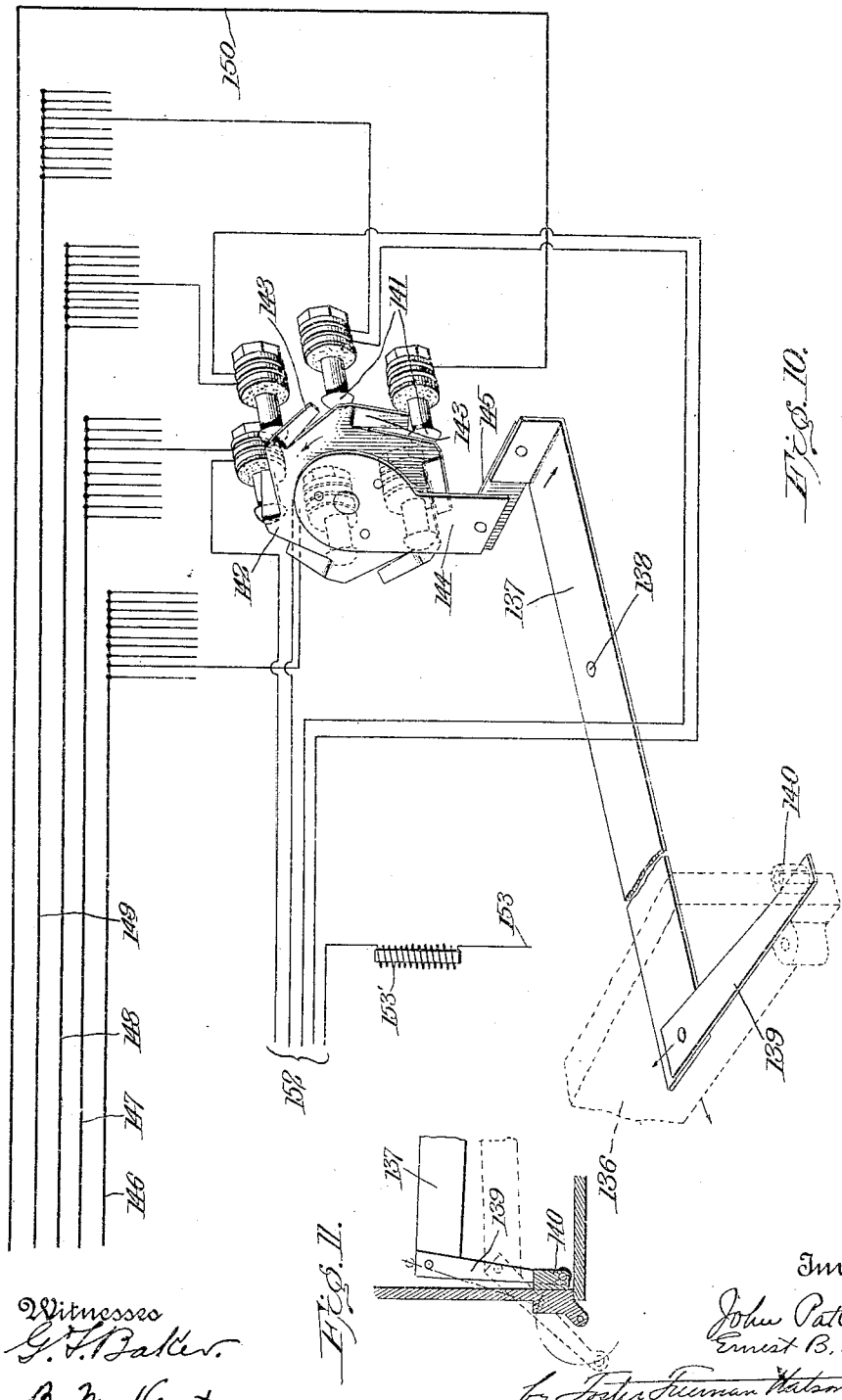

UNITED STATES PATENT OFFICE.

JOHN PATTEN AND ERNEST B. MILLER, OF BALTIMORE, MARYLAND.

RECORDING APPARATUS FOR SAFE-DEPOSIT BOXES.

1,274,761.  Specification of Letters Patent.  Patented Aug. 6, 1918.

Application filed August 22, 1914. Serial No. 858,085.

*To all whom it may concern:*

Be it known that we, JOHN PATTEN and ERNEST B. MILLER, citizens of the United States, residing at Baltimore, State of Maryland, have invented certain new and useful Improvements in Recording Apparatus for Safe-Deposit Boxes, of which the following is a specification.

This invention relates to automatic recording mechanisms and particularly to an apparatus adapted to be used in connection with a safe deposit vault for the purpose of recording the number and time when any box is opened.

It has been the custom heretofore to provide each safe deposit box with one lock requiring the use of two keys both of which must be used in order to open the box, one of the keys being held by the company owning the boxes and the other being held by the box renter, but it is possible for a dishonest employee to get an impression of the key held by the renter, or in some other way get a key which will open the box, so that the box may be opened and the contents rifled without the knowledge of the renter. It is the object of this invention to provide means which will absolutely prevent the opening of any box without a record being made, at some central point, of the number of the box and the time it was opened. With such a record the officials of the safe deposit company will know just what boxes are opened during each day and the time of opening, so that if a box has been opened without due authority of the renter it will be known. It will also be possible to keep a much closer watch on the boxes and in this way prevent their being opened by unauthorized persons.

The novel features of the invention will be apparent from the following description taken in connection with the accompanying drawings, in which, Figure 1 is a vertical section through a machine embodying the invention, the section being taken on the line 1—1 of Fig. 3;

Fig. 2 is a section on the line 2—2 of Fig. 3;

Fig. 3 is a plan view with certain parts broken away and with the arrangement of the control wires shown diagrammatically;

Fig. 4 is an enlarged sectional perspective view of one of the type bars and the operating mechanism connected therewith;

Fig. 5 is an enlarged side elevation of the blank-feeding mechanism;

Fig. 6 is a transverse section through the device for operating the inking ribbon;

Fig. 7 is an enlarged sectional view through the time-recording wheels;

Fig. 7ª is a face view of the time-recording dials;

Fig. 8 is a fragmentary edge view of the vibrating wheel;

Fig. 9 is a side elevation, partially in section, of a stack of safe deposit boxes;

Fig. 10 is a diagrammatic view of the wiring for the safe deposit boxes and also showing in perspective the controlling switch and contacts controlled thereby;

Fig. 11 is an enlarged section on the line 11—11 of Fig. 9.

The invention comprises recording mechanism located at any suitable point and contact devices associated with each safe deposit box and so arranged as to be actuated upon the opening and closing movements of the door of the box. The contact devices associated with each box are electrically connected with the recording apparatus so that when the door of a box is opened there is a record made of the number of the box and the time of opening. The contact devices are preferably so arranged that the recording mechanism will be actuated on the initial opening movement of the door. An alarm mechanism is also provided and arranged to be operated while the recording mechanism is operated. The parts are so arranged that after the door has been opened a certain extent the recording mechanism will be restored to its normal condition and the operation of the alarm mechanism interrupted. The door may then be fully opened without further actuation of the recording mechanism, but upon the return movement of the door the contact devices again cause the operation of the recording mechanism so that the complete record will show the time of opening of the door, the time of closing, and, from these, it will be possible to calculate the elapse of time between the opening and closing of the door. The invention is preferably provided with means for preventing the interference of one record with another, so that it will be impossible to actuate the recording mechanism to make a second record until after the completion of the first and the restoration of the recording mechanism to its normal condition.

The purpose of the alarm mechanism is to apprise an attendant, at the recording apparatus or elsewhere, of the fact that a box is being opened. In the usual opening of the door of a box, the alarm would operate only for a very brief interval, possibly only for a fraction of a second, and therefore, if the alarm operates for a longer period, the attendant will know that something unusual is occurring in the deposit box vault, and can make an investigation.

In this way the liability of a box being surreptitiously opened is largely eliminated.

In the form of the invention illustrated in the accompanying drawings, 10 indicates the base of the recording mechanism and on this base is secured a table 11 on which the recording apparatus is mounted. A frame 12 is supported on the table 11 by means of legs 13. The frame 12 comprises a slotted ring 14 to which a plurality of sets of type bars 15 are pivoted. Each set of type bars comprises ten independently operable bars numbered to represent the ten digits. As shown in Fig. 3, there are four sets of type bars 16, 17, 18 and 19 and by means of these four sets it is possible to indicate any number from 0 to 9,999, so that the apparatus illustrated is capable of recording the numbers of 10,000 boxes. It is, of course, possible to utilize this apparatus in connection with an additional lot of boxes by giving to the boxes numbers which are preceded by one or more ciphers.

From Figs. 1, 2 and 4, it will be evident that the normal position of the type bars is substantially vertical, the lower ends of the bars being arranged in slots in the ring 14 and the upper ends being in engagement with a backing ring 20. The frame 12 comprises the dished plate 21 having the downwardly projecting spaced lugs 22 and supporting a ring 23, to the upper end of which is secured a ring 24 having the downwardly projecting spaced lugs 25. The ring 20 is secured to the ring 24. A circumferentially extending slot 26 is arranged in the outer sides of the lugs 25 and in this slot is a wire 27, to which springs 28 are pivoted. These springs are arranged between the lugs 25 and have their inner ends connected with the upper ends of links 29, the lower ends of these links being pivotally connected with lugs 30 on the bars 15. The springs 28 have tongues 31 extending inwardly from the wire 27 and engaged by the adjustable screws 32. These parts are so arranged that, when the type bar is in the vertical position shown in Fig. 4, the line of thrust in the link 29 is outward of the pivot wire 33 on which the type bars are mounted.

A vertical shaft 34 is arranged in suitable bearings 35, 36 and is provided with an angularly disposed portion 37 on which is journaled the hub of a wheel 38, the plane of the wheel being normal to the axis of the portion 37 of the shaft and therefore out of normal with the main axis.

Referring to Figs. 1, 2 and 5, it will be seen that the periphery of the wheel 38 is provided with a slot 39 for the pivot wire 40 and on opposite sides of this pivot wire are the intersecting V-shaped slots 41, which receive the links 42. The links 42 have their upper ends pivoted to the type bars 15 and in their lower ends have two longitudinally extending slots 43 and 44, arranged in overlapping relation with their adjoining ends connected together, as shown in Figs. 2 and 4. The wire 40 passes through the slots 43, 44 of the links 42 and forms an operating connection between the wheel 38 and the links.

The shaft 34 carries at its upper end a driving wheel 45 which receives a belt 46, this belt being driven by a pulley 47 which is operated by the motor 48, or in any other suitable manner. The shaft 34 is continuously rotated and, since the wheel 38 is journaled on the shaft and held against rotation, it will be given a peculiar wabbling or vibratory motion as the shaft rotates. When the type bars 15 are in the vertical position the wire 40 moves up and down in the slots 43 of the links 42, these slots being of sufficient length to permit the wire to vibrate without moving the links. When it is desired to actuate any of the type bars, the lower end of the link 42 connected therewith is drawn sidewise to carry the wire 40 from the slot 43 into the slot 44 and, since this transferring will take place when the wire is substantially at the limit of its upward movement, the succeeding downward movement of the wire will cause it to engage the end 49 of the slot 44 and draw the link 42 downward with it. The connection between the link 42 and the bar 15 causes the latter to swing on its pivotal connection with the wire 33 until the line of thrust in the link 29 crosses to the inner side of the wire 33, when the action of the spring 28 will give a sudden impulse to the bar and cause it to strike a sharp blow on the recording surface.

The shaft 34 will be operated at a comparatively high speed, preferably several hundred revolutions per minute, and, since each type bar is independently operable, it is obvious that as many bars may be operated at one time as desired. In order to have the bars systematically record the numbers of the boxes, the bars of each set are so arranged that the types 50 at the upper ends thereof strike at the same point on the recording surface and therefore, in the practical operation of the machine, but one bar of each set may be operated at the same time.

Referring to Fig. 3, it will be seen that one bar of each of the sets 16, 17, 18 and 19 is shown in the printing position, the four bars being arranged with their types side by side.

The recording surface consists preferably of one or more blank strips of paper or other suitable material which are automatically fed to present a clean surface for each record. The record strips are shown at R in the drawings and it is preferable to provide two strips with a strip of carbon impression paper between, so that records will be made on both strips in the manner similar to the usual manifolding operation on a typewriter. A reel 51 is supported on suitable brackets 52 and carries the supply of record strips which are fed over the guide rollers 53 and 54 and the platen 55. From the roller 54 the strips pass to a reel 56 carried by brackets 57 and one strip is wound on this reel and the other strip with the carbon impression paper is allowed to feed off, as shown in Fig. 2. The record strips are fed forward after each printing operation by a mechanism which will be described hereinafter.

The record on the upper strap is preferably made by means of a suitable inked ribbon similar to that employed on typewriters. This ribbon is moved transversely of the path of the record strip by suitable mechanism so as to present a new surface for each impression. Referring to Figs. 1 and 6, this ribbon is shown at R' and passes over the record strips R around a suitable guide pulley 58 and under the platen 55. The portion of the ribbon above the platen passes around a guide pulley 59 and is wound on a reel 60. The portion of the ribbon below the platen passes around a guide pulley 61 and is wound on a reel 62. The reels 60 and 62 are supported on suitable brackets and intermittently rotated by ratchet and pawl mechanism. This mechanism consists of oscillatable arms 63 and 64 supported to swing about the axes of the reels 60 and 62 and connected together by a link 65. The arm 63 carries a pawl 66 which is adapted to engage a ratchet wheel 67 secured to the reel 60. The arms 63 and 64 are oscillated by means to be described hereinafter and each oscillation causes the pawl 66 to move the ratchet wheel 67 and the reel 60 (see Fig. 6) so as to wind the ribbon R' on the reel. The pawl 66 is held in engagement with the ratchet wheel by means of a suitable spring 68 carried by the arm 63. The arm 64 also carries a pawl 69 which is held either in engagement with the ratchet wheel 70, which is secured to the reel 62, or out of engagement with the ratchet wheel, as shown in Fig. 6. It will be evident from the drawings that the oscillation of the arms 63 and 64 will cause the ribbon R' to be drawn from the reel 62 and wound on the reel 60, but, if the pawl 66 is swung to a position similar to that occupied by pawl 69 and the latter is swung into engagement with the ratchet wheel 70, it will be evident that the ribbon R' will be drawn from the reel 60 and wound onto the reel 62. In this way the ribbon may be run back and forth by the feeding mechanism.

The types carried by the bars 15 strike the ribbon R' and make impressions on the record strips and it will be evident from the foregoing that if the links 42 connected with any of the type bars of each set have their lower ends simultaneously moved sidewise to transfer the wire 40 from the slot 43 to the slot 44 all of these type bars will be actuated, substantially at the same time, to make a record. If suitable mechanism is provided whereby, when the door of any safe deposit box is opened, the links 42 connected with the type bars indicating such box are simultaneously moved sidewise, a record will be made to indicate that the door of such box has been opened.

For the purpose of moving the lower ends of the links 42 sidewise to actuate the bars 15, there is associated with each of the links one or more solenoids 71, these solenoids beings supported on brackets 72 secured to the plate 21. Each solenoid or pair of solenoids has associated therewith an armature 73, the upper end of which is arranged in the space between two of the lugs 22 and pivoted to a wire 74 which is arranged in suitable slots 75 in the lugs. The lower end of each armature 73 is connected with a link 42 by means of the link 76. (See Fig. 4). By the foregoing construction, when the solenoids 71 are energized, the armature 73 will be moved toward the solenoids and thus move the link 42 connected therewith. When any link 42 has been thus moved by the solenoid associated therewith it will be instantly pulled down by the wheel 38, owing to the fact that the latter is vibrated at high frequency. The solenoid will act instantly upon the closing of its circuit and therefore the whole operation of making the record will be practically instantaneous. In order to effect a return movement of the link 42 after a record has been made, and in order to restore the type bars 15 to their normal position, there is provided a spring 77 below each solenoid or pair of solenoids and between the bracket 72 and the armature 73, this spring acting in opposition to the force of attraction of the solenoids and pushing the armature away from the solenoids when the latter are deënergized.

In addition to recording the number of the box opened, it is also desirable to record the time of opening and, for this purpose, there is provided above the platen 55 a series of concentric dials 78, 79, 80. The dial 78 preferably indicates the year and month. The dial 79 is preferably marked with the numbers 1 to 12 to indicate hours of the day and the dial 80 is preferably provided with numbers running from 1 to 60 to indicate the minutes. This dial is also used to indicate the day of the month. Between the dials 78 and 79 is an annular space in which travels an indicator 81 to show the hour of the day. This indicator is carried by a wheel 82 provided on its periphery with gear teeth 83 which mesh with teeth on a gear 84, which is rotated by the tubular shaft 85. Between the dials 79 and 80 is an annular space in which travels an indicator 86 to show the minutes. This indicator is carried by a wheel 87 having on its periphery gear teeth which mesh with the teeth on a gear wheel 88, the latter wheel being secured to the tubular shaft 89, which rotates in the shaft 85. Around the exterior of the dial 80 there travels an indicator 90 which is carried by a wheel 91. This wheel has gear teeth on its periphery which mesh with the teeth on the gear wheel 92, which is secured to the shaft 93, this shaft rotating in the tubular shaft 89. Above the wheels 83 and 84 there is a plate 94 and between the wheels 83, 84 and the wheels 87, 88 is a plate 95 to which the dial 79 is secured. Between the gear wheels 87, 88 and the wheels 91, 92 there is a plate 96 to which the dial 80 is secured. Below the wheels 91, 92 there is a plate 97, so that the plates 94 and 97 form covers for the series of gear wheels.

The shafts 85, 89 and 93 are actuated by a suitable clock mechanism 98, which may be of any preferred construction. In order to make an impression of the time dials and indicators associated therewith, there is provided above the plate 94 a striking plate 99 which is adapted to receive blows from a hammer 100. The hammer 100 consists preferably of a cup-shaped member filled with suitable material and having arms 101 by means of which it is pivotally mounted on a shaft 102. The hammer is also provided with a laterally projecting lug 103 to which the upper end of an actuating link 104 is connected. The lower end of the link 104 (see Fig. 1) is connected with a lever 105 which is pivoted on a bracket 106, secured to the lower side of the table 11. A push rod 107 is pivotally connected with the lever 105 and carries a collar 108 which serves as an abutment for the spring 109, the upper end of this spring bearing against the under side of the frame 12, so that the spring pushes downwardly on the rod 107. In the inoperative position the hammer 100 is supported by a bracket 110 and from Fig. 1 it will be seen that the line of pull of the link 100 on the hammer tends to securely hold the hammer against the bracket 110. The action of the spring 109 and link 104 is similar to that of the spring 28 and the link 29 in holding the type bars in their inoperative position. In order to actuate the hammer, there is secured on the shaft 102 an arm 111 to which the upper end of a link 112 is pivoted. The lower end of the link 112 is formed the same as one of the links 42 and is arranged to be actuated by the wheel 38 in the same manner as the links 42. In order to move the lower end of the link 112 sidewise there is provided a pair of solenoids 113 on a bracket 114 and similar in function to the solenoids 71. The bracket 114 has an arm 115 to which the armature 116 is pivoted. The upper end of the armature 116 is connected with the link 112 by the link 117.

In the operation of the hammer, whenever the solenoids 113 are energized the link 112 is moved sidewise and the hammer swung away from the bracket 110 until the line of pull of the link 104 is on the inner side of the shaft 102 and then the spring 109 will quickly swing the hammer until it strikes the plate 99. When the armature 116 is restored to its normal position by the spring 118, the wheel 38 will move the link 112 to its original position and thus swing the hammer against the bracket 110, the spring 109 being at the same time compressed. A link 119 connects the arm 111 with the plate 63 (see Fig. 1) and therefore the plates 63 and 64 are caused to oscillate with the hammer 100 and, from Fig. 6, it will be obvious that the ribbon will be moved during the return stroke of the hammer.

An alarm device, preferably an electric bell 1051 is sounded when the recording mechanism is actuated by having the outer end of the lever engage the contacts 1052 on the under side of the table 11 and thereby close the circuit 1053, the lever and the contacts being arranged to operate as an ordinary knife switch. When the hammer 100 is restored to its normal position, the circuit 1053 is again opened and the alarm will then be silent until the hammer is again actuated.

From Fig. 3 it will be apparent that the type bars 15 print on the record blank the number of the box, on one side of the time record.

After each printing operation it is necessary to feed the record blank forward and for this purpose there is provided a shaft 120 mounted in brackets 121 and loosely carrying the roll 54. The shaft 120 has secured thereto a ratchet wheel 122 and a pulley wheel 123. A belt 124 extends from the wheel 123 to a pulley wheel 125 which operates the reel 56. A pawl 126 is pivotally mounted on a lever 127 which is fulcrumed on a bracket 128. The pawl 126 coöperates with the ratchet wheel 122 and on the upward movement of the lever 127 rotates the shaft 120 and thereby draws the record strips R forward the proper amount. The outer end of the lever 127 has connected therewith the upper end of a link 129, the lower end of this link being connected with the lever 105. (See Figs. 1 and 5.) It will therefore be seen that the record strips are fed forward on the return stroke of the hammer.

In order to prevent interference of records, there is associated with each set of type bars a U-shaped member 130 (see Fig. 4) which is pivoted on a suitable bracket 131. It will be observed that the links 42 are much wider at the bottom than at the top and when one of the links is drawn downwardly by the wheel 38 the link 76, which is connected therewith, will engage the outer end 132 of the member 130 and swing the latter downwardly to the dotted position. In order to hold the member 130 with the end 132 against the under side of the links 76, any suitable means may be provided, such as the spring 133. The descent of one of the links 42 carries the member 130 downward until the end 132 thereof is opposite the wide portions of the links 42, which are in their inoperative position. This will prevent these links from being drawn sidewise by their solenoids and therefore the member 130 will constitute a locking means which will prevent a confusion of records. In case a second set of solenoids is energized while a record is being made, the parts will not be affected because the links 42 cannot be drawn sidewise until the original record has been completed.

From the foregoing it will be seen that we have provided a recording mechanism for automatically recording the time and number and also for feeding a record blank and for feeding an inking ribbon. The parts are so arranged that but one type bar from each set may be actuated at the same time and further means are provided for preventing an interference between records. The electrical connections with the solenoids which control the recording mechanism are preferably so arranged that the solenoids 113 will be actuated simultaneously with any of the solenoids 71 and in this way a time record will always be made simultaneously with a number record.

Referring to Figs. 9 to 11, it will be seen that we have illustrated stacks of safe deposit boxes 134. These boxes are usually arranged in stacks and the stacks are placed side by side and preferably with their backs adjacent a wall 135. Each box is provided with a door 136 at the front thereof and in carrying out this invention it is preferable to arrange the electrical contact devices so that they will be actuated upon the initial opening movement of the door. A thin sheet iron strip 137 is pivoted at 138 to the bottom of the box and above this strip is a sheet metal partition 138 which protects the strip. The outer end of the strip 137 has pivotally connected therewith a link 139, which is also pivotally connected with a lug 140 on the inner side of the door.

It will be evident from this construction that, when the door is opened, the strip 137 will be swung on the pivot 138. This swinging movement of the strip 137 is utilized for operating the contact devices which consist preferably of a series of contacts 141 secured in the rear wall of the box in circular arrangement. A switch or contact device 142 is pivoted to the rear wall of the box and provided with tongues 143 which are adapted to move into and out of engagement with the contacts 141 when the switch 142 is turned. In order to turn the switch 142 it has secured thereto an arm 144 which is pivotally connected with the strip 137 by a link 145 so that the oscillation of the strip 137 by the door 136 effects an oscillation of the switch member 142. In Figs. 10 and 11 the door 136 is shown in closed position and it will be evident that when it is swung from this position the switch member 142 will be turned in the direction of the arrow thereon and carry the tongues 143 into engagement with the contacts 141. From Fig. 11 it will be apparent that in opening the door the strip 137 is first swung in the direction to move the switch member 142 in the direction of the arrow and then further movement of the door causes the strip to be swung in the opposite direction to disengage the tongues 143 from the contacts 141.

It will also be apparent that during the closing movement of the door the switch member 142 will be turned so as to cause the tongues 143 to engage the contacts and since the recording mechanism, herein-above described, is actuated whenever the tongues 143 engage the contact devices, a record will be made when the door is closed as well as when it is opened.

Each of the contact devices 141 has a wire connected therewith at the rear of the box and these wires extend to cables which may be concealed in any suitable manner. There is a separate wire for each solenoid or pair of coöperating solenoids in the recording mechanism and therefore for each set of ten type bars there will be ten wires. In Fig. 3 we have shown four sets of type bars so that there will be forty wires for actuating these bars. These wires are preferably arranged in four cables which are indicated in Fig. 3 as 146, 147, 148 and 149. There is also a common feeder 150 that is connected with the solenoids so that the current will flow from the feeder through the solenoid and the circuit extending from the solenoid to the contact devices 141.

In Fig. 3 we have indicated diagrammatically the arrangement of the circuits and in this diagram 142' and 142" indicate the switch members of two boxes. The contacts are indicated at 141' and it will be seen that the switch member 142' is disconnected from the contacts 141' and the switch member 142" is connected with the contacts 141'. There are shown five contacts 141' associated with each switch member and it will be observed that four of the contacts 141' associated with the switch member 142' are connected with wires in the cables 146, 147, 148 and 149. The other contact member 141' is connected with the feeder wire 150 which, it will be observed, contains the source of electricity 151 and also has in circuit therewith the solenoids 113. If the switch member 142' is turned into engagement with the contacts 141' it will be seen that current will flow from the feeder 150 through the switch member and contacts and through one wire in each of the cables. Since each of these wires is connected with a solenoid and one terminal of each solenoid is connected with the wire 150, it will be seen that four solenoids, one in each set, will be energized and cause the actuation of four type bars. The solenoid 113 will be simultaneously energized and cause the time-recording mechanism to be operated. The switch member 142" operates in a similar manner, but a different set of wires or circuits is connected with the terminal 141' connected therewith, so that, when the switch member 142" is moved into engagement with its contacts, a different set of solenoids will be energized, with the exception that the solenoids 113 will be energized the same as in the case of the switch member 142'.

From the foregoing it will be seen that various combinations of the wires of each cable may be effected to record the numbers of boxes from 0 to 9,999.

It is frequently desirable to test the different circuits without opening the doors of the boxes and for this purpose a separate wire is connected with each of the contacts 141 and these wires are brought together in groups, as indicated at 152. A feeder wire 153, having in circuit therewith a solenoid device 153' similar to the solenoids 71 and arranged to actuate a type bar 154 (see Fig. 3), adapted to print the letter T or some other distinguishing mark beside the number of the box, is common to all of the groups 152, so that when a group of wires 152 is connected by any suitable device, such as a cup of mercury, a record will be printed similar to that made when the door of the box is opened, with the exception that the letter T will appear beside the number of the box to indicate that the record is a test record.

Various ways of arranging the cables in the safe deposit box vault may be provided and in Fig. 9 we have shown an arrangement in which the wires extend along the top of the stacks in a systematic way so that connections may readily be made with the contacts at the rear of the boxes. In order to protect the wires, which are arranged above the stacks, there may be provided a cover plate 155 which is secured to the front of the stacks at 156 and extends to the wall 135.

It will be obvious that various changes may be made in the details of the construction without departing from the spirit of our invention and therefore we desire to have it understood that the construction shown and described is merely illustrative of the principles of our invention.

Having thus described the invention, what is claimed is:

1. In apparatus of the class described, the combination of means for feeding a record blank, a plurality of stations each having a door and a switch actuated thereby, means for recording the designations of said stations on the blank, and electrical means controlled by said switches for actuating said recording means on the opening and closing movements of said doors.

2. In apparatus of the class described, the combination of means for feeding a record blank, a plurality of stations each having a door and a switch operated thereby, means for recording the designations of said stations on the blank, means for recording times on the blank, and electrical means controlled by said switches for actuating said recording means on the opening and closing movements of said doors.

3. In apparatus of the class described, the combination of means for feeding a record blank, a plurality of stations each having a manually operated part and a switch operated thereby, means for recording the designations of said stations on the blank, automatically changing time-recording means, and electrical means controlled by said switches for actuating said recording means twice on each cycle of movement of said parts.

4. In apparatus of the class described, the combination of means for feeding a record blank, a plurality of stations each having a manually operated part and a switch actuated thereby, selectively-operated means for recording the designations of said stations on the blank, and electrical means controlled by said switches for actuating said recording means twice on each cycle of movement of said parts.

5. In apparatus of the class described, the combination of means for feeding a record blank, a plurality of stations each having a manually operated part and a switch actuated thereby, selectively-operated means for recording the designations of said stations on the blank, automatically changing time-recording means, and electrical means controlled by said switches for actuating said recording means twice on each cycle of movement of said parts.

6. In apparatus of the class described, the combination of means for feeding a record blank, a plurality of stations, a plurality of independently operable recording means, vibratory means, members adapted to connect said vibratory means and said recording means, and electrical means controllable from said stations to move said members into and out of operative connection with said vibratory means.

7. In apparatus of the class described, the combination of means for feeding a record blank, an oscillatable type bar, vibratory means, a member adapted to operatively connect said type bar with said vibratory means, and spring means for completing the recording movement of said type bar after the same has been started by said vibratory means.

8. In apparatus of the class described, the combination of means for feeding a record blank, a type bar, means for automatically operating the type bar, and spring means adapted to complete the recording movement of said type bar after the same has been started by said operating means.

9. In apparatus of the class described, the combination of means for feeding a record blank, a type bar, means for automatically operating the type bar, and spring means connected with said type bar and normally holding the same in the inoperative position, said spring means being also adapted to complete the recording movement of the type bar after the same has been started by said operating means.

10. In apparatus of the class described, the combination of a type bar having a fixed pivot, an actuating member connected with said type bar, a stop which is engaged by said bar when in the inoperative position, and spring means connected with said bar and normally holding the same against said stop, said spring means being also adapted to complete the printing movement of said type bar after the same has been started by said actuating member.

11. In apparatus of the class described, the combination of time-recording means, a pivotally mounted hammer for operating said recording means, and spring means adapted to normally hold said hammer in the inoperative position and to complete the operating movement of the hammer.

12. In apparatus of the class described, the combination of pivotally mounted recording means, a member connected with said recording means having a slot at one end thereof, a vibratory member, and means for moving said slotted member so that one end of the slot therein will be engaged by said vibratory member to actuate said recording means.

13. In apparatus of the class described, the combination of a plurality of independently operable type bars, a rotating shaft having a wheel thereon, inclined with respect to the axis of the shaft, and means adapted to operatively connect said wheel with said type bars.

14. In apparatus of the class described, the combination of a plurality of independently operable type bars, a continuously rotating shaft, a wheel having a slotted periphery and mounted on said shaft with its axis at an angle to the axis of said shaft, and members arranged in the slotted periphery of said wheel and connected with said type bars for actuating the latter.

15. In apparatus of the class described, the combination of a plurality of type bars, a continuously rotating shaft, a wheel on said shaft and having its axis inclined with respect to the axis of the shaft, said wheel having a slotted periphery, members connected with said type bars and having slotted portions arranged in the slots in said wheel, and a connecting member carried by said wheel and arranged in said slots, as and for the purpose described.

16. In apparatus of the class described, the combination of a type bar, a continuously rotating shaft, a non-rotating wheel mounted on said shaft with its axis at an angle to the axis of the shaft, said wheel having a slotted periphery, a member connected with said type bar and having two connected slots therein, means carried by said wheel and engaging the slot in said member to form a connection between the wheel and member, and means for shifting said member to effect engagement of said last mentioned means with the end of one of said slots, as and for the purpose described.

17. In apparatus of the class described, the combination of recording members, means for feeding a record blank, means for actuating said recording members including a continuously vibrating element having connections with each of the said members, and means whereby said vibratory element is adapted to operate said blank feeding means.

18. In apparatus of the class described, the combination of a box having a door hinged thereto, contact devices arranged within the box on the wall opposite said door, a switch coöperating with said contact devices, a lever pivoted to one of the walls of the box, and means connecting the opposite ends of said lever with said switch and said door whereby the switch is actuated by a movement of the door.

19. In apparatus of the class described, the combination of a box having a door hinged thereto, contact devices on the wall of the box opposite said door, a switch coöperating with said contact devices, a pivotally mounted lever within the box, and means connecting the opposite ends of said lever with said switch and said door, the parts being so arranged that the switch is actuated to connect said contact devices and to disconnect the same during an opening movement of the door.

20. In apparatus of the class described, the combination of a box having a door hinged thereto, contact devices secured on a wall of the box, a pivotally mounted switch coöperating with said contact devices, a lever pivotally connected with one of the walls of the box on the interior thereof, and links connecting the opposite ends of said lever with said switch and said door.

In testimony whereof we affix our signatures in presence of witnesses.

JOHN PATTEN.
ERNEST B. MILLER.

Witnesses:
H. L. EDDY,
RALPH C. SHARRETTS,
GRACE L. SELBY.

Copies of this patent may be obtained for five cents each, by addressing the "Commissioner of Patents, Washington, D. C."